United States Patent
Gadepalli et al.

(10) Patent No.: US 9,189,229 B2
(45) Date of Patent: *Nov. 17, 2015

(54) SELF-DIAGNOSING PROCESSES USING QUICK RESPONSE CODES

(71) Applicants: Venkata Vishwanath Gadepalli, Apex, NC (US); Ashok Kumar Iyengar, Encinitas, CA (US); Belinda Ying-Chieh Langner, Pittsburgh, PA (US)

(72) Inventors: Venkata Vishwanath Gadepalli, Apex, NC (US); Ashok Kumar Iyengar, Encinitas, CA (US); Belinda Ying-Chieh Langner, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,235

(22) Filed: Jun. 26, 2013

(65) Prior Publication Data

US 2014/0034721 A1   Feb. 6, 2014

Related U.S. Application Data

(63) Continuation of application No. 13/565,436, filed on Aug. 2, 2012.

(51) Int. Cl.
  *G06F 9/44*    (2006.01)
  *G06F 9/445*   (2006.01)
  *G06F 11/00*   (2006.01)
  *G06F 11/22*   (2006.01)

(52) U.S. Cl.
  CPC .. *G06F 8/71* (2013.01); *G06F 8/60* (2013.01); *G06F 11/006* (2013.01); *G06F 11/2247* (2013.01)

(58) Field of Classification Search
  None
  See application file for complete search history.

(56) References Cited

U.S. PATENT DOCUMENTS

| | | | |
|---|---|---|---|
| 7,353,995 B2 | 4/2008 | Strickland | |
| 7,392,421 B1 * | 6/2008 | Bloomstein et al. | 714/4.4 |
| 7,765,194 B1 | 7/2010 | Sharma et al. | |
| 8,276,820 B2 | 10/2012 | Sao et al. | |
| 2008/0209413 A1 | 8/2008 | Kakumani et al. | |
| 2008/0320117 A1 | 12/2008 | Johnsen et al. | |

(Continued)

OTHER PUBLICATIONS

Herrara, Elizabeth M., et al. "A Methodology for Self-Diagnosis for Software Quality Assurance in Small and Medium-Sized Industries in Latin America," The Electronic Journal on Information Systems in Developing Countries, EJISDC (2003).

(Continued)

*Primary Examiner* — Isaac T Tecklu
*Assistant Examiner* — Reshaun M Finkley
(74) *Attorney, Agent, or Firm* — Grasso PLLC; Fred Grasso

(57) ABSTRACT

Method for diagnosing consistency of a software cluster utilizing a machine parsable code includes a deployment manager configured to function as a master node of the software cluster, a plurality of nodes connected to the deployment manager, and an electronic device or devices registered with the deployment manager. The deployment manager can be configured to generate a master quick response code and each of the plurality of nodes can be configured to generate a node quick response code. The electronic device(s) may be associated with a system administrator and may also be installed with application software. Embodiments may allow the system administrator to encode, manage and analyze diagnostic information of the nodes in the software cluster utilizing the master quick response code and the node quick response code in an efficient manner.

5 Claims, 5 Drawing Sheets

(56) References Cited

U.S. PATENT DOCUMENTS

| | | |
|---|---|---|
| 2009/0228694 A1 | 9/2009 | Karstens |
| 2011/0239208 A1* | 9/2011 | Jung et al. ............... 717/170 |
| 2012/0131416 A1 | 5/2012 | Dugan |
| 2013/0239104 A1 | 9/2013 | Savant et al. |
| 2013/0283397 A1 | 10/2013 | Griffin |
| 2013/0332995 A1* | 12/2013 | Bultman ..................... 726/4 |
| 2014/0197232 A1* | 7/2014 | Birkler et al. ............. 235/375 |

OTHER PUBLICATIONS

Graves, Steve, "Self-Diagnostic APIs: Software Qualitiy's Next Frontier," Linux Journal, Apr. 1, 2004.

* cited by examiner

SELF-DIAGNOSING PROCESSES USING QUICK RESPONSE CODES

CITATION TO RELATED CASES

This application is a continuation of U.S. application Ser. No. 13/565,436, which was filed on Aug. 2, 2012, and is entitled Self-Diagnosing Systems Using Matrix Barcodes.

BACKGROUND

The field of the invention regards systems and methods for establishing or maintaining network clusters. More specifically, the consistency or adaptability of network software clusters is measured, tracked or maintained using machine parsable codes, such as a quick response code or other machine readable codes.

Application clustering or software clustering links multiple computer servers into a cluster—a group of servers that act like a single system. Each of the servers in a cluster may maintain the same information and may collectively perform administrative tasks such as load balancing, determination of node failures, and assignment failover duty. Application clusters are readily considered scalable because servers may be added or removed from the cluster as needs arise or as technology warrants.

When an application cluster is created, supplemented or changed, versions of various software applications and operating systems may need to be confirmed as being compatible or as being within a range of suitable compatibility in order for the cluster to function. Such a compatibility analysis may be automated by software for testing application cluster configurations. A compatibility analysis may also be performed by system administrators, who may visually compare the software configurations of all the nodes of the cluster to confirm that all nodes are compatible with each other. The automated and the manual comparisons may each be difficult when comparing large software clusters having multiple software dependencies. For example, checking compatibility of application software and operating systems can be tedious and prone to erroneous results.

Automated compatibility testing systems can include storing configuration details in image headers that may be used to check version compatibility. These compatibility testing systems may utilize version code-based image headers to store configuration details. The headers may then be compared during installation to verify version compatibility. Using these headers may serve to limit the amount of information to be stored and compared.

BRIEF SUMMARY

Systems, methods, devices, and articles of manufacture are provided herein. These embodiments may be used for managing or monitoring or establishing application clusters using computer readable quick response codes. These quick response codes (QR) may be embedded with version or compatibility information of one or more components or applications of a cluster. The quick response codes may be read and compared by machines or users or both in order to analyze the compatibility of nodes in the cluster. This compatibility may be analyzed at set up, during operation, and when changes in the cluster occur.

In embodiments a system may be provided wherein the system may include a software cluster having a deployment manager configured to function as a master node, a plurality of nodes, and one or more other electronic devices registered with the deployment manager. The deployment manager may be configured to generate a master quick response code and each of the plurality of nodes may be configured to generate a node quick response code. In embodiments, the electronic device may be associated with a system administrator and may be installed with application software on numerous portable electronic devices. Through the use of the quick response codes, such as the comparison between or observation of master quick response codes and node quick response codes, the system may allow a system administrator to encode, manage, and analyze diagnostic information of the nodes in the software cluster utilizing. In embodiments this diagnostic information or analysis may include version control and compatibility control.

In embodiments methods may include processes for diagnosing consistency or compatibility of software clusters. These processes may include gathering diagnostic information of software clusters by a system administrator, initiating a function, such as a genVersionQuickResponseCode function implemented on the deployment manager by the system administrator to generate a master quick response code, invoking a function implemented on the plurality of nodes to generate specialized node quick response codes, and comparing the quick response codes in an automated fashion, manual fashion or both to determine version inconsistency or version compatibility of a cluster environment. These comparisons may be between a deployment manager and a plurality of nodes or other cluster applications or systems. In embodiments, version inconsistency may be encoded in a new quick response code and this new quick response code may be transmitted to an electronic device of the system administrator via a communication means, scanning and automatically decoding the new quick response code into a readable form by the electronic device. These transmitted quick response codes may be read by the system administrator to understand the version inconsistency, diagnose cluster issues, and resolve any version inconsistency identified automatically or by a system administrator or other user.

Numerous configurations and variants may be employed in embodiments and may include comparing the current component configurations or quick response codes with the last stored component configurations, with or without quick response codes, to determine any changes in configuration or compatibility. In embodiments, a system administrator or other designee may be notified of a configuration change or notified incompatibility and may use these notifications or information to consider or evaluate consistencies or compatibilities. The notifications may use quick response codes from a deployment manager and quick response codes from a node of the cluster to transmit or hold version or compatibility information. In embodiments, the quick response codes may be compatible with and may be read by hand-held electronic devices such as mobile phones or tablet devices. The use of these portable devices may provide additional flexibility and robustness for an administrator or user.

Still further, processes may be used in embodiments to encode the configuration parameters in a quick response code, transmit the quick response code to a process control system, and decode the quick response code to configure the system. In this method or in others, the quick response code may be also automatically decoded into a human readable form. This human readable form can include color changes, the introduction of human readable text or images into the quick response code and through other human readable forms as well. In so doing, a system administrator or other person may be notified of configuration changes and may even be informed based on the configuration of the quick response code itself. Further, the amount and the type of information that can be stored or transmitted using the quick response codes may be modified and enhanced in embodiments depending on factors such as system hardware.

Thus, embodiments may serve to manage configuration compatibility in a streamlined or tailored manner that may include the use of machine parsable code, preferably a quick response code, to save diagnostic information. In so doing, embodiments may compare quick response codes of various nodes to detect version changes, may be able to store large amounts of diagnostic information in the quick response code, and may provide a quick response code to other devices by scanning the code or using other transmission methodologies. As mentioned above, embodiments may be able to notify a system administrator or user of version changes by employing color coded quick response codes and may be able to transmit version changes to the system administrator through various communication means included wired and wireless means. Embodiments may also provide real-time cluster-management to the system administrator and provide meaningful amounts of diagnostic information in the quick response code in addition to version and compatibility information.

These and other embodiments and combinations are plausible and may be practiced drawings from the teachings and disclosure provided herein, and the many embodiments of the invention.

DETAILED DESCRIPTION

Embodiments can provide systems, methods, and articles of manufacture for diagnosing consistency or compatibility of a software cluster. Such embodiments may serve to diagnose consistency of a software cluster and provide tools to determine version inconsistency. In embodiments, version inconsistency may be determined autonomically as well as by a system administrator or user. In embodiments, the use of quick response codes may enable improved analysis by enabling users access to version information or other compatibility information through the use of hand-held or other portable quick response code scanning devices.

Figure 1:
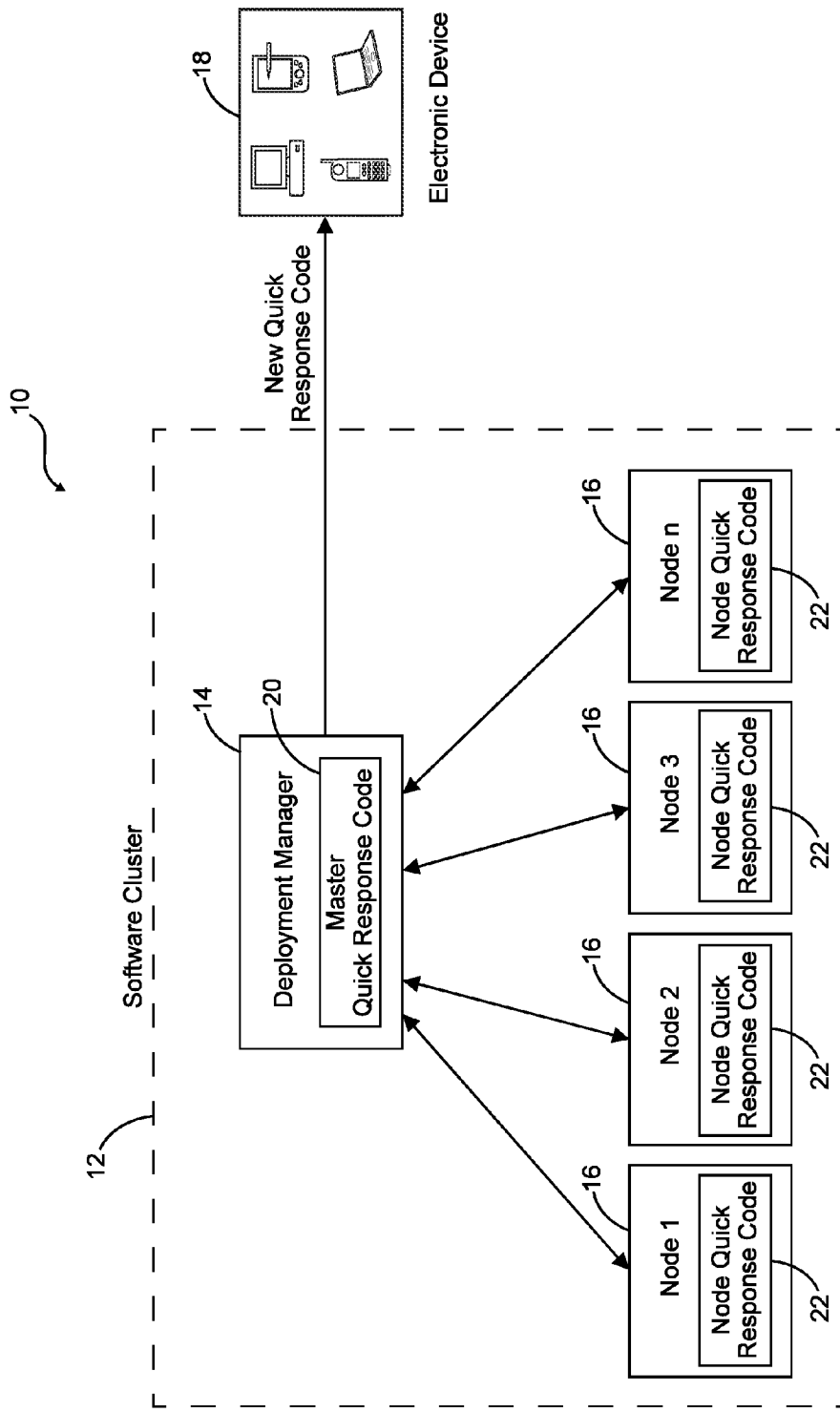
FIG. 1 illustrates a block diagram of a system for diagnosing consistency of a software cluster as may also be employed in embodiments.

FIG. 1 illustrates a block diagram of the system 10 for diagnosing consistency of the software cluster 12 utilizing a machine parsable code in accordance with embodiments of the present invention. The system 10 is shown to comprise a deployment manager 14 configured to function as a master node of the software cluster 12, a plurality of nodes 16 connected to the deployment manager 14, and an electronic device 18 registered with the deployment manager 14. The deployment manager 14 may be configured to generate a master quick response code such as a quick response QR Code® 20 and each of the plurality of nodes 16 may be configured to generate a node quick response code 22. The electronic device 18 may be associated with a system administrator and may be installed with application software. The system 10 and other embodiments may allow the system administrator to easily encode, manage and analyze diagnostic information of the nodes in the software cluster 12 utilizing the master quick response code 20 and the node quick response code 22. The diagnostic information includes state information and version information of the nodes in the software cluster 12.

While creating a software cluster, the system administrator may gather all the diagnostic information of all the nodes of the software cluster 12. The diagnostic information may include state information and version information of the deployment manager and the other nodes. For example, a system administrator may initiate a genVersionQuickResponseCode function implemented in the deployment manager to generate the master quick response code 20. The genVersionQuickResponseCode function may gather diagnostic information of the deployment manager 14, encode the diagnostic information, and generate a master quick response code 20. The master quick response code 20 generated may be stored in a master pre-defined location on the deployment manager 14. The master pre-defined location may be an option folder "/opt/mastVerQuickResponseCode." In embodiments, the deployment manager 14 may be considered to be a master node of the software cluster 12.

In embodiments initiating the genVersionQuickResponseCode function may in turn invoke a nodeVerQuickResponseCode function implemented on each of the plurality of nodes 16. The nodeVerQuickResponseCode function may gather the diagnostic information of each of the plurality of nodes 16, encode the diagnostic information and generate the node quick response code 22 on each of the plurality of nodes 16. The diagnostic information may include version information, instance information, and other compatibility indicia, as well as other specifics applicable to cluster compatibility.

In embodiments, the node quick response code 22 generated may be stored in a node pre-defined location on each of the plurality of nodes. The node pre-defined location may be another option folder "/opt/nodeVerQuickResponseCode." The master pre-defined location and the node pre-defined location stores the master quick response code 20 and the node quick response code 22 respectively and may be accessible by all the nodes in the software cluster 12.

The system 10 may use a compareQuickResponseCode function to compare the master quick response code and the node quick response code to determine version inconsistency between the deployment manager 14 and the plurality of the nodes 16. The compareQuickResponseCode function may be implemented in the deployment manager 14 and the compareQuickResponseCode function may also be implemented in any other node of the software cluster 12. The compareQuickResponseCode function programmatically compares the master quick response code 20 and the node quick response code 22 to determine version inconsistency.

Also, in embodiments, the system 10 may encode the version inconsistency in a new quick response code, which may be transmitted to the electronic device 18 via a communication device or suitable means. The new quick response code may also be displayed on the system 10 and the version inconsistency may be stored in a location "/opt/logVerQuickResponseCode" along with a date and timestamp. The communication means may be selected from a group consisting of: Bluetooth®, SMS and e-mail. The electronic device 18 may be selected from a group consisting of: mobile phones, smart phones, laptops or personal computers.

The new quick response code may allow the system administrator to understand the version inconsistency, analyze the diagnostic information of the software cluster 12 and access an administration console to resolve the version inconsistency. The system administrator can scan or read (or both), the new quick response code using the application software implemented in the electronic device 18.

The application software may, thus, be made compatible with the system 10 so that the electronic device 18 can easily scan the new quick response code and automatically decode the new quick response code into a human readable form or a more human readable form if some human readable information is already resident. In other words, by reading the new quick response code, the system administrator may be informed of the version inconsistency in the system 10. The system administrator may also have detailed information about various software levels of the cluster from the quick response code. The new quick response code may also provide a link to access the administration console, which the administrator can use to resolve the issues. Furthermore, the new quick response code may also include an error code, which can be accessed by the system administrator to compare against a knowledge database so as to find a quick resolution. In addition, the new quick response code may also include a notification which allows the administrator to open a problem report.

The system 10 or other embodiments may, thus, allow the system administrator to easily encode, manage and diagnose configuration information in the software cluster 12. The master quick response code 20 and the node quick response code 22 are machine parsable codes, which allow computers to easily understand and compare diagnostic information.

Figure 2:
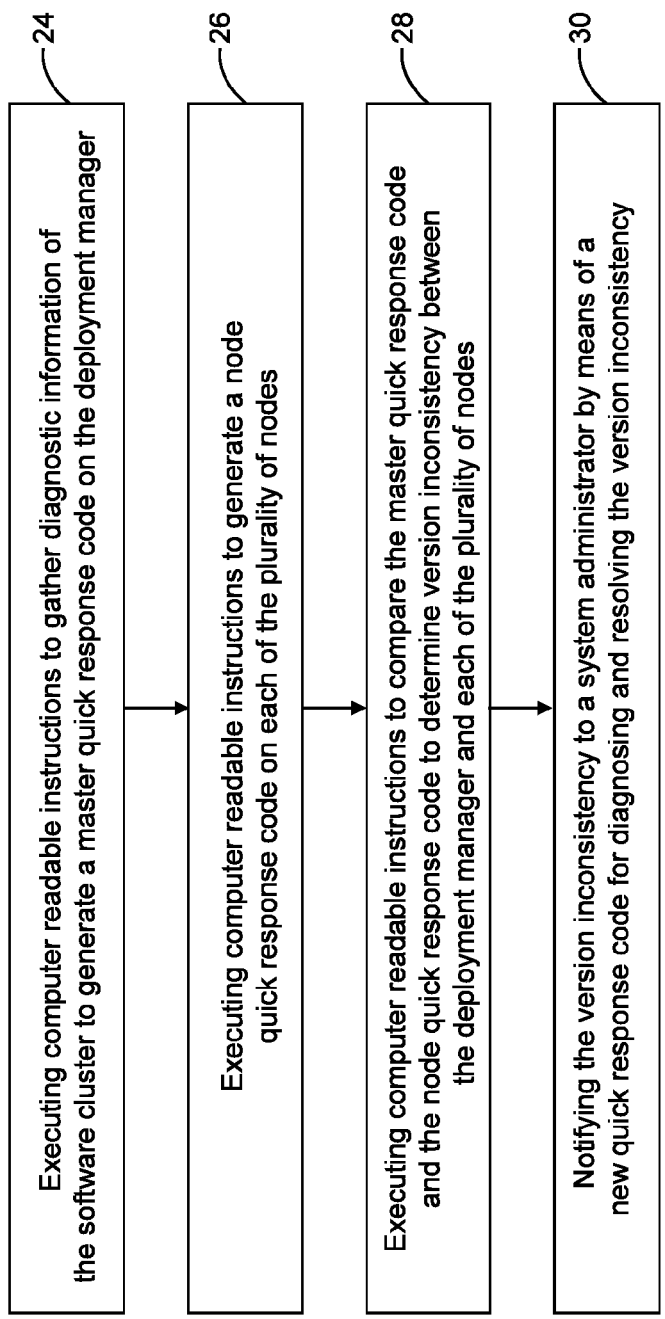
FIG. 2 illustrates a high-level operational flow chart of the system for diagnosing consistency of the software cluster as may also be employed in embodiments.

FIG. 2 illustrates a high-level operational flow chart of the system 10 for diagnosing consistency of the software cluster 12 in accordance with embodiments. This flow chart depicts a computer program product for diagnosing consistency of the software cluster 12. The processes or steps identified therein may be carried out in the disclosed order or in other orders, with more or fewer steps, with modifications to those steps, and all while remaining within the scope of the disclosure and the accompanying invention.

As indicated at block 24, computer readable instructions may be executed to gather diagnostic information of the software cluster to generate a master quick response code on the deployment manager. In a next step, computer readable instructions may be executed to generate a node quick response code on each of the plurality of nodes as shown in block 26. Computer readable instructions may also be executed to compare the master quick response code and the node quick response code to determine version inconsistency between the deployment manager and each of the plurality of nodes as indicated at block 28. Afterwards, the version inconsistency may be notified to the system administrator by means of a new quick response code as shown in block 30.

Figure 3:
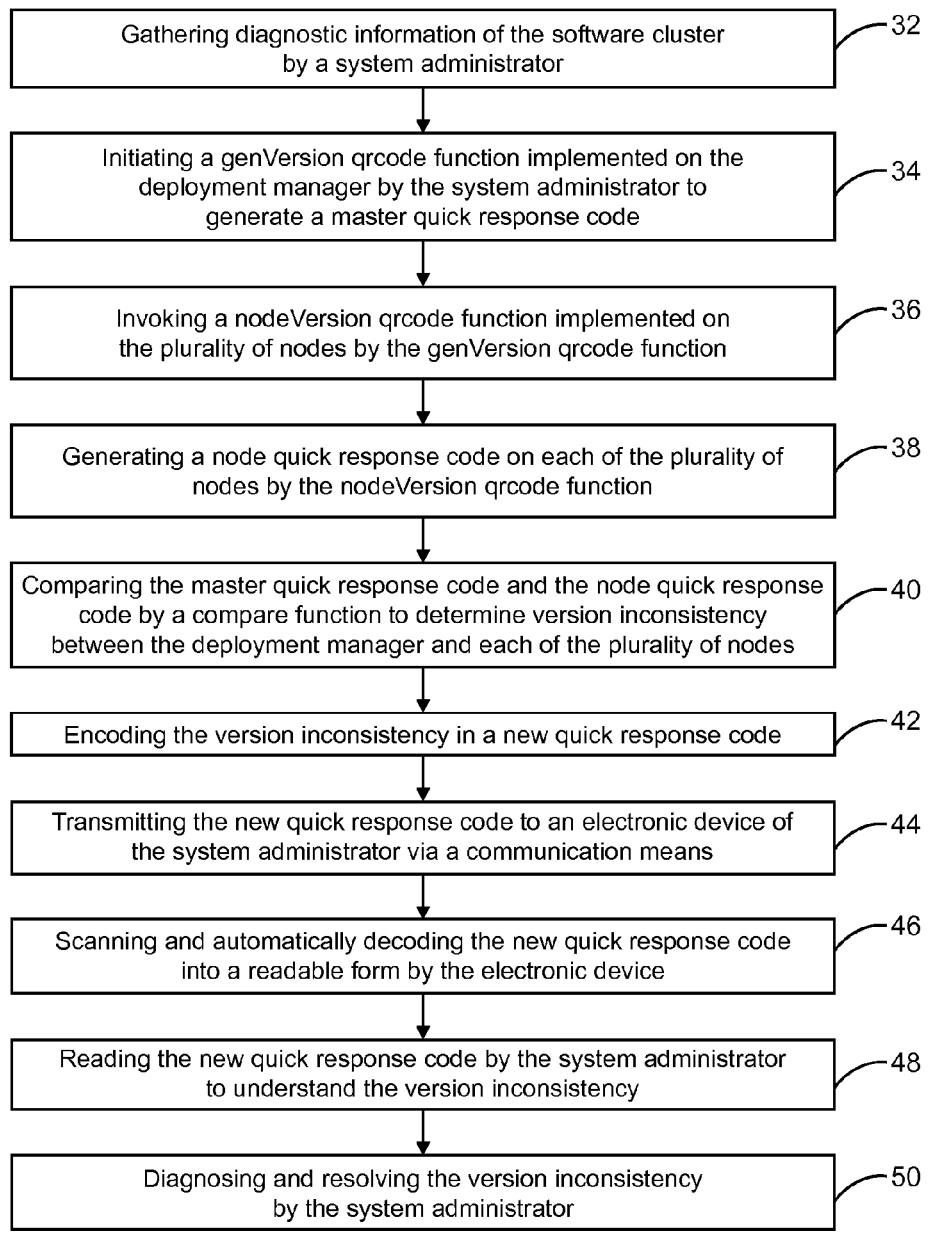
FIG. 3 illustrates a detailed flow chart reflecting a method for diagnosing consistency of the software cluster as may also be employed in embodiments.

FIG. 3 illustrates a detailed flow chart reflecting a method for diagnosing consistency of the software cluster in accordance with embodiments of the invention. Initiating at block 32, diagnostic information of the software cluster may be gathered by a system administrator. As shown in block 34, a genVersionQuickResponseCode function implemented on the deployment manager may be initiated by the system administrator to generate a master quick response code. A nodeVerQuickResponseCode function implemented on the plurality of nodes may then be invoked by the genVersionQuickResponseCode function as indicated at block 36 and a node quick response code may be generated on each of the plurality of nodes by the nodeVerQuickResponseCode function as shown in block 38. In next step 40, the master quick response code and the node quick response code may be compared by a compareQuickResponseCode function to determine version inconsistency between the deployment manager and the plurality of nodes. The version inconsistency may be encoded in a new quick response code as indicated at block 42. The new quick response code may be transmitted to an electronic device of the system administrator via a communication means as shown in block 44. Then, the new quick response code may be scanned and automatically decoded into a readable form by the electronic device as indicated at block 46. As shown in block 48, the new quick response code may be read by the system administrator to understand the version inconsistency. Using this information, the version inconsistency may be diagnosed by the system administrator as indicated at block 50.

The new quick response code may also be provided with a color attribute so that the system administrator can easily identify the issues. For instance, a system without version inconsistency may have a green quick response code. The new quick response code encoded with error information would have a different color attribute. This may allow the system administrator to easily spot the different colored quick response codes, which may enable him to quickly identify and resolve errors.

The quick response code may store a large amount of information that can be readily read by machines. The information encoded in the quick response code may also be parsable into plain English-like language, which may be easily read by the machines and humans. By embedding the configuration information in the quick response codes, the system 10 can provide a means to compact diagnostic information and can allow the system administrator to retrieve information quickly.

Figure 4:
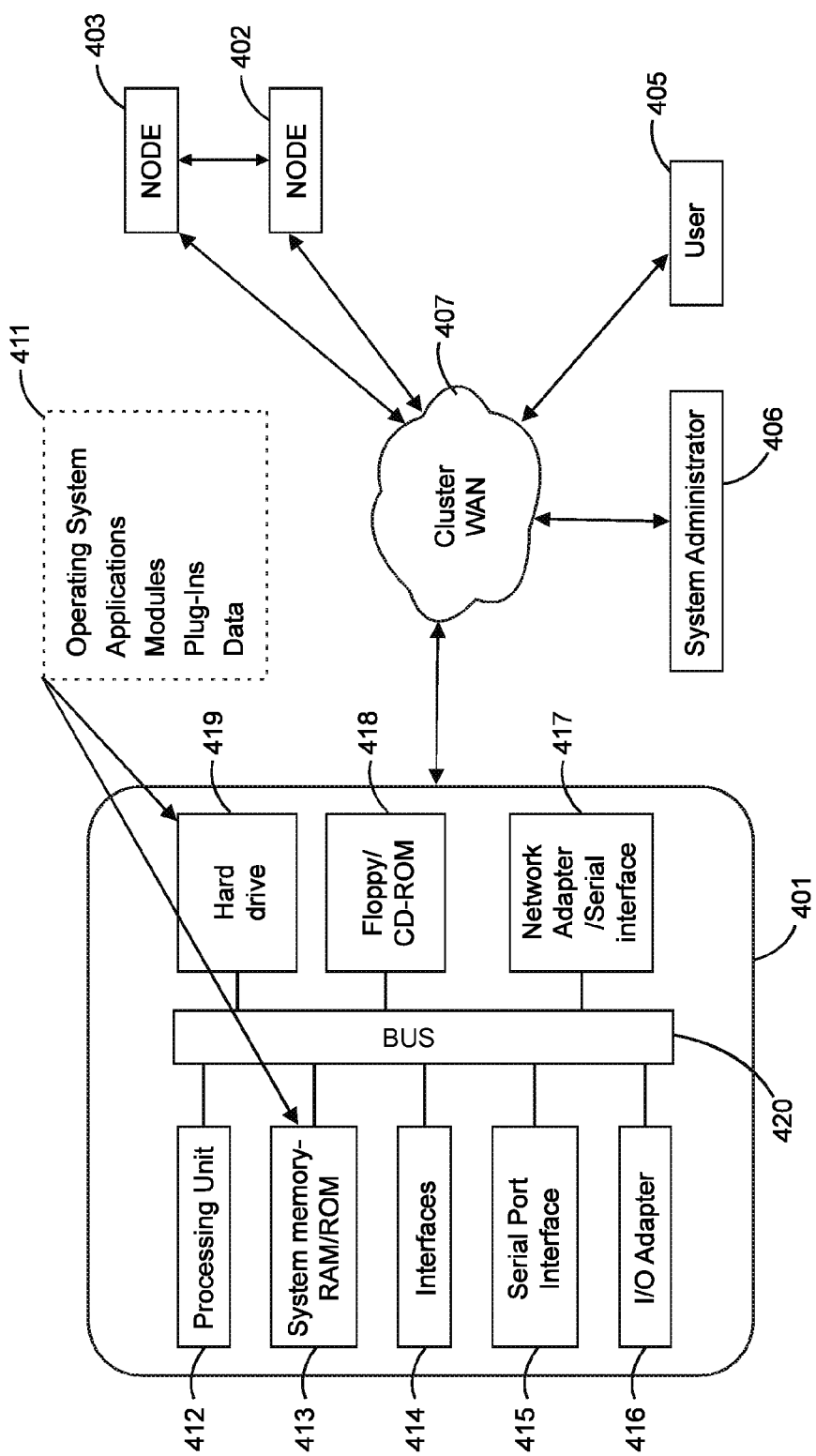
FIG. 4 illustrates a schematic of a deployment manager and nodes as may also be employed in embodiments.

FIG. 4 shows a schematic of deployment managers and nodes as may be employed in embodiments. Visible in FIG. 4 are a deployment manager 401, an administrator 406, a user 405, nodes 402 and 403 and a cluster wide-area-network 407. The deployment manager 401, which may function as a master node, is shown with a bus 420, a hard drive 419, a floppy CD-ROM 418, a network adapter 417, an I/O adapter 416, a serial port interface 415, additional interfaces 414, system memory 413, and a processing unit 412. Each of these components within the deployment manager 401 communicate back-and-forth and receive power from the bus 420.

Also shown in FIG. 4 is code 411 that may be resident on the hard drive 419 and in system memory 413. This code 411 may be parsed and executed by the processing unit 412. As can be seen the code 411 may include an operating system, applications, modules, plug-ins, and data. The components of the deployment manager 420 and its code 411 may also be found in the nodes 402 and 403 as well as in the administrator device 406 and in the user 405 device. Each of these components may communicate back and forth with one another through the cluster WAN 407.

As with the above, the deployment manager 401 may serve to allow a system administrator to understand the version inconsistency, analyze the diagnostic information of the software cluster, and access an administration console to resolve the version inconsistency or incompatibility. The system administrator can scan/read the new quick response code using the application software implemented in the deployment manager 401 or the device 406.

The application software may be made compatible because the electronic device 406 can easily scan the new quick response code and automatically decode the new quick response code into a human readable form. In other words, by reading the new quick response code, the system administrator may be informed of the version inconsistency in the cluster system being considered and may take action to resolve the inconsistency so that the cluster can perform as targeted QOS levels. The system administrator may also have detailed information about various software levels of the cluster from the quick response code.

In embodiments, the new quick response code may also provide a link to access the administration console, which the administrator can use to resolve the issues. Furthermore, the new quick response code may also include an error code, which can be accessed by the system administrator over the WAN other network, to compare against a knowledge database so as to find a quick resolution. In addition, the new quick response code may also include a notification that allows the administrator to open a problem report.

Figure 5:
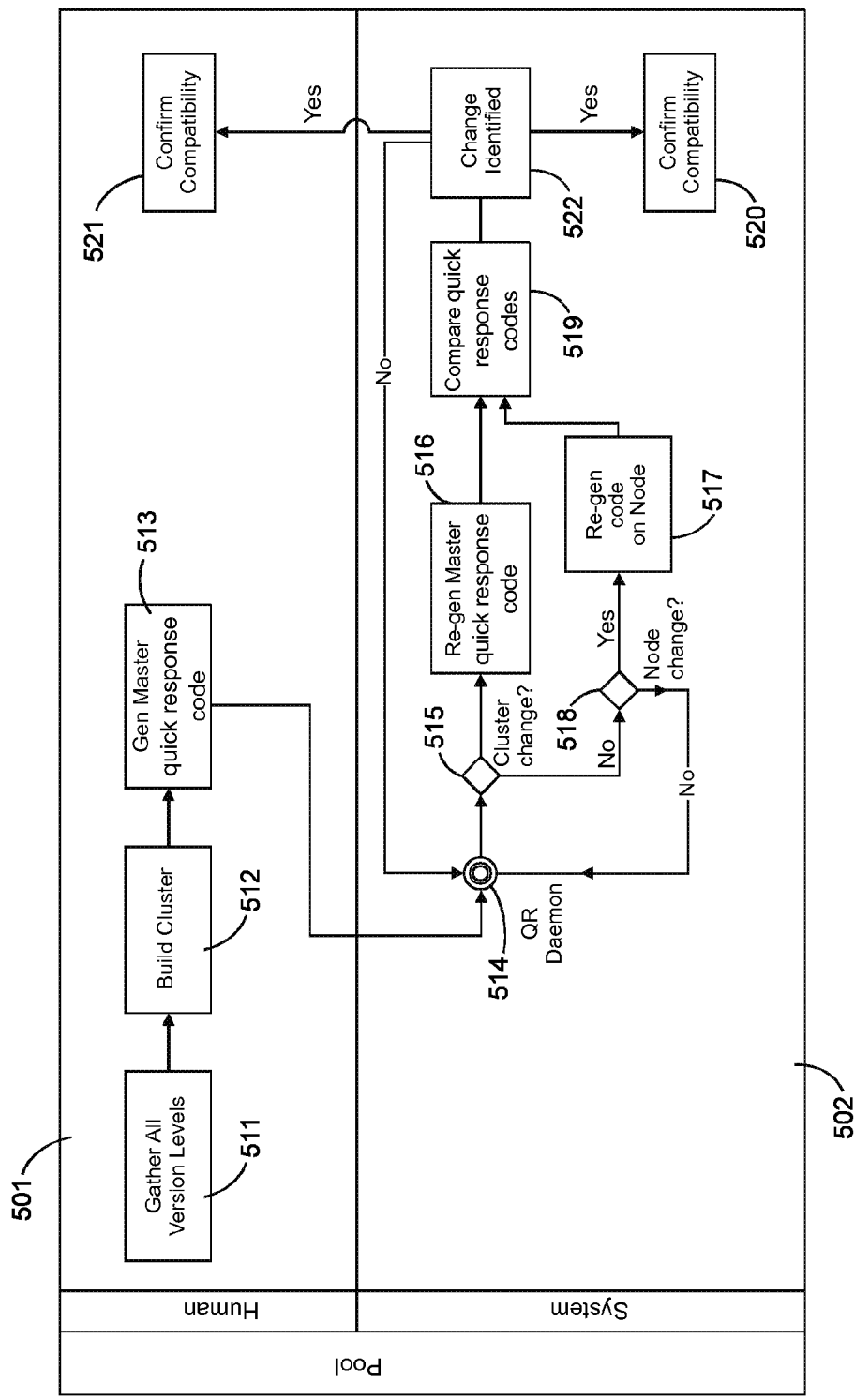
FIG. 5 illustrates a flow diagram showing how matrix bar coding processes and comparisons may be carried out autonomically and manually in accord with embodiments.

FIG. 5 shows a flow diagram employing processes as may be carried out in embodiments. As shown in FIG. 5 processes may be carried out automatically by the system, as shown in area 502 and with human intervention, as shown in area 501. At the outset of the cluster configuration a user, administrator, or other person may gather version levels information for each of the components and software applications to be employed in the cluster. This gathering is shown at 511. Upon verifying the version or compatibility information for the cluster components and applications, a user may build the cluster as shown at 512. This compiled and version check information may be used as inputs to a quick response code generation function that generates a master quick response code for the cluster. This master quick response code generation is shown by 513.

Area 502, which shows autonomic functions of embodiments, shows that a quick response code Daemon or subsystem may receive the master quick response code 513 and work in conjunction with the comparator 515 to determine if a cluster change has occurred. If the comparator 515 determines that a cluster component or software has changed the quick response code Daemon 514 may serve to regenerate Master quick response code as shown at 516. Likewise a comparator 518 may also identify changes in nodes of the cluster, and if appropriate, regenerate quick response codes on those particular nodes, as shown at 517. These regenerated Master quick response codes and quick response codes may be compared as shown at 519, and if changes are detected, the compatibility between the components or software may be evaluated and confirmed. When no pertinent changes are detected by the comparator 522 the Master quick response code, and the quick response code on the nodes may all be provided back to the subsystem 514. Likewise, the comparator 518, upon not sensing any change in configurations, may send an existing configuration schematic version information back to the quick response code Daemon 514.

The process flow shown in FIG. 5 may include additional as well as fewer components or steps. Some additional steps may include further intervention by a user or administrator, including visual inspection of quick response codes, and system entry of direct version data. Other changes, for example less intervention by the administrator, may be done as well.

While the present invention has been described in terms of a system which notifies version inconsistency of a software cluster in the form of quick response code to a system administrator, this is not a necessary condition of the invention. Instead, the quick response code may be automatically regenerated by the system 10 when there is a change in the software cluster, without human intervention. Further, while preferred embodiments may use an electronic device for diagnosing the version inconsistency of the system, this does not have to be in all embodiments. For example, the administrator may diagnose the inconsistency on the system itself. Additionally, while the present invention has been described in terms of generating the master quick response code by initiating the genVersionQuickResponseCode function, this is not a necessary condition of embodiments. The quick response code may be generated using application programming interfaces (API) such as Google Chart API or other means. Still further, in some implementations, the functions noted in the block may occur out of the order noted in the figures. For instance, two blocks shown in succession may, in fact, be executed substantially concurrently.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited for a particular contemplated use. For example, embodiments may be employed with existing cluster management techniques that are designed for simple, low-cost management of distributed and clustered power systems in technical and commercial computing environments.

What is claimed is:

1. A method for diagnosing consistency of a software cluster utilizing a machine parsable code, the method comprising the steps of:
   gathering diagnostic information of the software cluster by a system administrator, the software cluster comprising a deployment manager and a plurality of nodes;
   initiating a first function implemented on the deployment manager by the system administrator to generate a master quick response code;
   invoking a second function implemented on the plurality of nodes by the first function;
   generating a node quick response code on each of the plurality of nodes by the second function;
   comparing the master quick response code and the node quick response code by a third function to determine version inconsistency between the deployment manager and each of the plurality of nodes;
   encoding the version inconsistency in a new quick response code;
   transmitting the new quick response code to an electronic device of the system administrator via a communication means;
   scanning and automatically decoding the new quick response code into a readable form by the electronic device;
   reading the new quick response code by the system administrator to understand the version inconsistency; and
   diagnosing and resolving the version inconsistency by the system administrator.

2. The method of claim 1 wherein the initiating step further comprises: gathering diagnostic information of the deployment manager, encoding the diagnostic information and generating the master quick response code by the first function.

3. The method of claim 1 wherein the generating step further comprises: gathering diagnostic information of each of the plurality of nodes, encoding the diagnostic information and generating the node quick response code for each of the plurality of nodes by the second function.

4. The method of claim 1 wherein the reading step further comprises: understanding the version inconsistency, retrieving the diagnostic information of the software cluster and accessing an administration console to resolve the version inconsistency by the system administrator.

5. The method of claim 1 wherein the communication means may be selected from a group consisting of: short-range wireless communication protocol, SMS and e-mail.

* * * * *